(12) United States Patent
Freyhof

(10) Patent No.: US 7,950,276 B1
(45) Date of Patent: May 31, 2011

(54) SYSTEM AND METHOD OF FORMING VEHICLE TEST ROAD BY JOINING PRE-FABRICATED PAVEMENT MODULES

(75) Inventor: David Freyhof, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 357 days.

(21) Appl. No.: 12/169,487

(22) Filed: Jul. 8, 2008

(51) Int. Cl.
*E01C 23/00* (2006.01)
(52) U.S. Cl. .......................................................... 73/146
(58) Field of Classification Search .................. None
See application file for complete search history.

(56) References Cited

U.S. PATENT DOCUMENTS

| | | | |
|---|---|---|---|
| 1,660,421 A | | 2/1928 | Knight |
| 2,072,301 A | * | 3/1937 | Grayson .................... 366/45 |
| 2,181,623 A | * | 11/1939 | Klein ............................ 404/63 |
| 2,396,808 A | | 3/1946 | Abel |
| 3,536,562 A | | 10/1970 | Shipp et al. |
| 4,453,360 A | * | 6/1984 | Barenberg ................ 52/396.04 |
| 6,102,614 A | | 8/2000 | Yukawa |
| 6,626,607 B1 | | 9/2003 | Hiramatsu et al. |
| 6,688,808 B2 | | 2/2004 | Lee |
| 6,709,192 B2 | | 3/2004 | Smith |
| 6,827,521 B2 | | 12/2004 | Sproules |

FOREIGN PATENT DOCUMENTS

EP 0726361 B1 7/2003

* cited by examiner

*Primary Examiner* — Lisa M Caputo
*Assistant Examiner* — Jermaine Jenkins
(74) *Attorney, Agent, or Firm* — Standley Law Group LLP

(57) ABSTRACT

A modular vehicle test road construction system and associated installation method. The system includes pre-fabricated pavement modules adapted to be transportable. The pre-fabricated modules are formed so that an upper driving surface thereof includes one or more vehicle testing profiles. The modules are preferably placed adjacent to one another on an engineered surface (e.g., road bed). Adjacent modules may be bonded together using a grout key. A number of modules may be arranged to create a test road of a desired shape and length, and having one or more desired vehicle testing profiles. Use of the modules allows for the creation of an adaptive test road that can be easily reconfigured. Modules of the present invention may also be inserted into an existing test road to impart a particular testing profile thereto.

12 Claims, 6 Drawing Sheets

SYSTEM AND METHOD OF FORMING VEHICLE TEST ROAD BY JOINING PRE-FABRICATED PAVEMENT MODULES

TECHNICAL FIELD

The claimed invention relates to a pavement for vehicle test roads. More particularly, the claimed invention relates to a pavement for vehicle test roads formed by joining pre-fabricated modules.

BACKGROUND

Conventionally, a driving surface on a test road suitable for track testing a vehicle has been constructed at the testing location by forming a concrete test road, then applying a separate testing profile to the driving surface (pavement) by using adhesives or mechanical fasteners. However, such a conventional method of constructing the pavement of an automobile test road has several drawbacks. For example, this method of applying individual testing profiles is quite time consuming and not easily moveable to other areas of the test road. Moreover, conventional methods of construction raise the issue of durability of the affixed testing profiles.

Consequently, it can be understood that there is a need for a test road pavement method and system for increasing both the durability and speed of test road construction. Preferably, such a method and system would allow the test road to be reconfigured easily and in a timely manner.

SUMMARY

The claimed invention is directed to a vehicle test road pavement system and to a method for installation thereof. Certain embodiments of the pavement system may provide a repeatable and replaceable vehicle testing surface. Various vehicle testing profiles may include "Belgian" brick, alternating rumble strips, moguls, and a variety of other test surfaces.

The pavement system may include pre-fabricated pavement modules designed to adopt a variety of testing surfaces and to be arranged so as to form a desired test road configuration. A pre-fabricated module may have a width dimension that approximates one lane of traffic, although other widths are certainly possible. A module is preferably light enough in weight to allow for easy installation and replacement, while being heavy enough to minimize movement due to vehicle traffic.

Certain exemplary embodiments of a pavement system of the present invention may include pre-fabricated modules having a specific driving surface. The driving surface may incorporate a particular testing profile. When creating a test road, modules may be placed on an engineered surface. A plurality of modules may be placed end-to-end so as to form a test road of desired length and configuration. The abutting edges of adjacent modules may form a keyway that can be filled with grout or a similar substance to lock the modules together and increase the stability of the test road. Such a grout key may also serve to help align adjacent modules and to provide a level surface therebetween.

The claimed invention provides consistency, durability, and the ability to efficiently create and/or alter a vehicle test road or a driving surface thereof as required to meet vehicle testing requirements. The claimed invention also allows a test road to be essentially constructed off-site.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features and wherein.

DETAILED DESCRIPTION OF THE EXEMPLARY EMBODIMENT(S)

Figure 1:
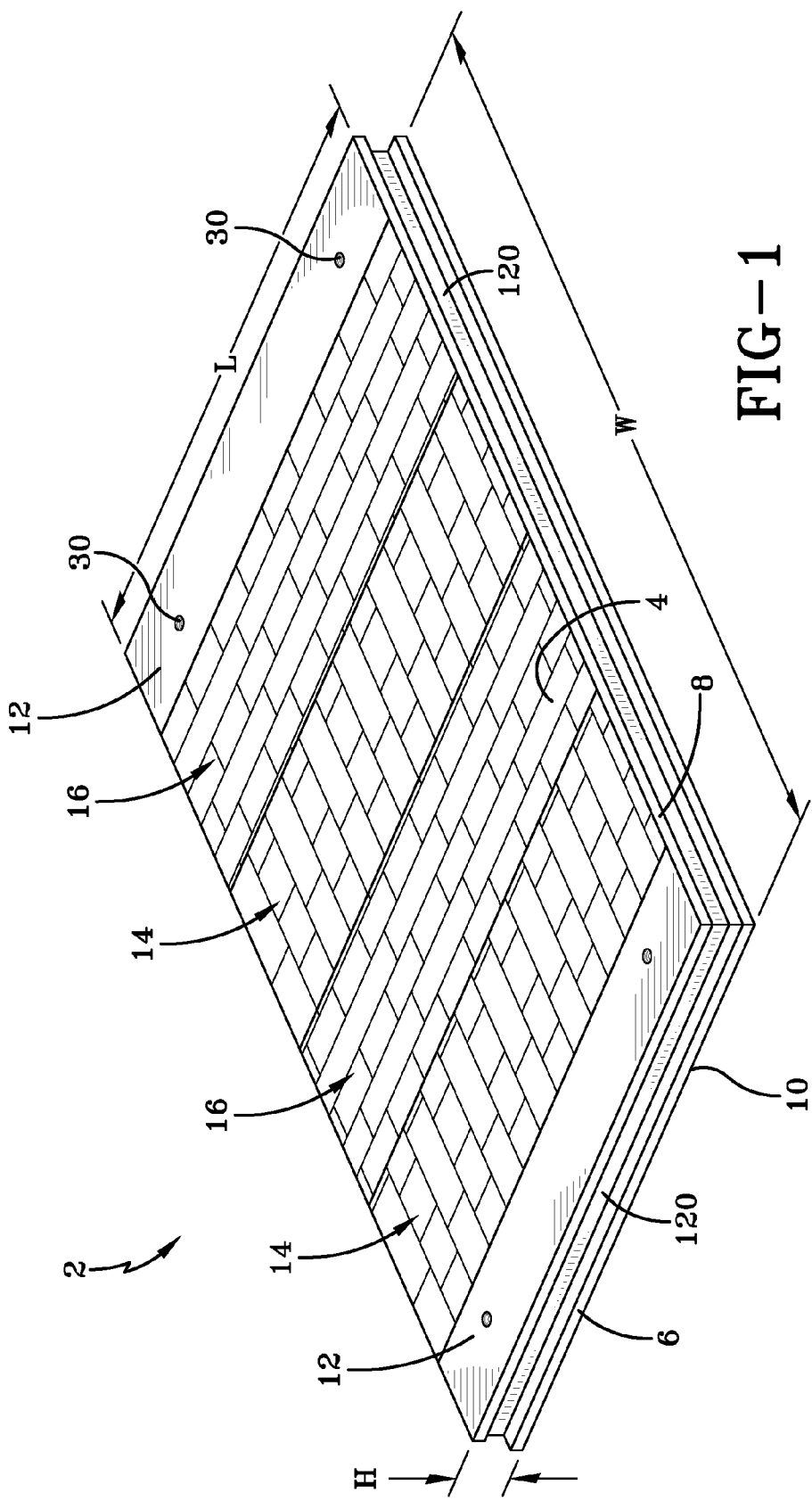
FIG. 1 is a perspective view of one exemplary embodiment of a pre-fabricated pavement module of the present invention.

Although certain exemplary embodiments will be shown and described in detail, it should be understood that various changes and modifications may be made thereto without departing from the scope of the appended claims. The scope of the invention is in no way limited to the number of constituting components, the materials thereof, the shapes thereof, the relative arrangement thereof, etc. Although the drawing figures are intended to illustrate exemplary embodiments, the figures are not necessarily drawn to scale.

Figure 2:
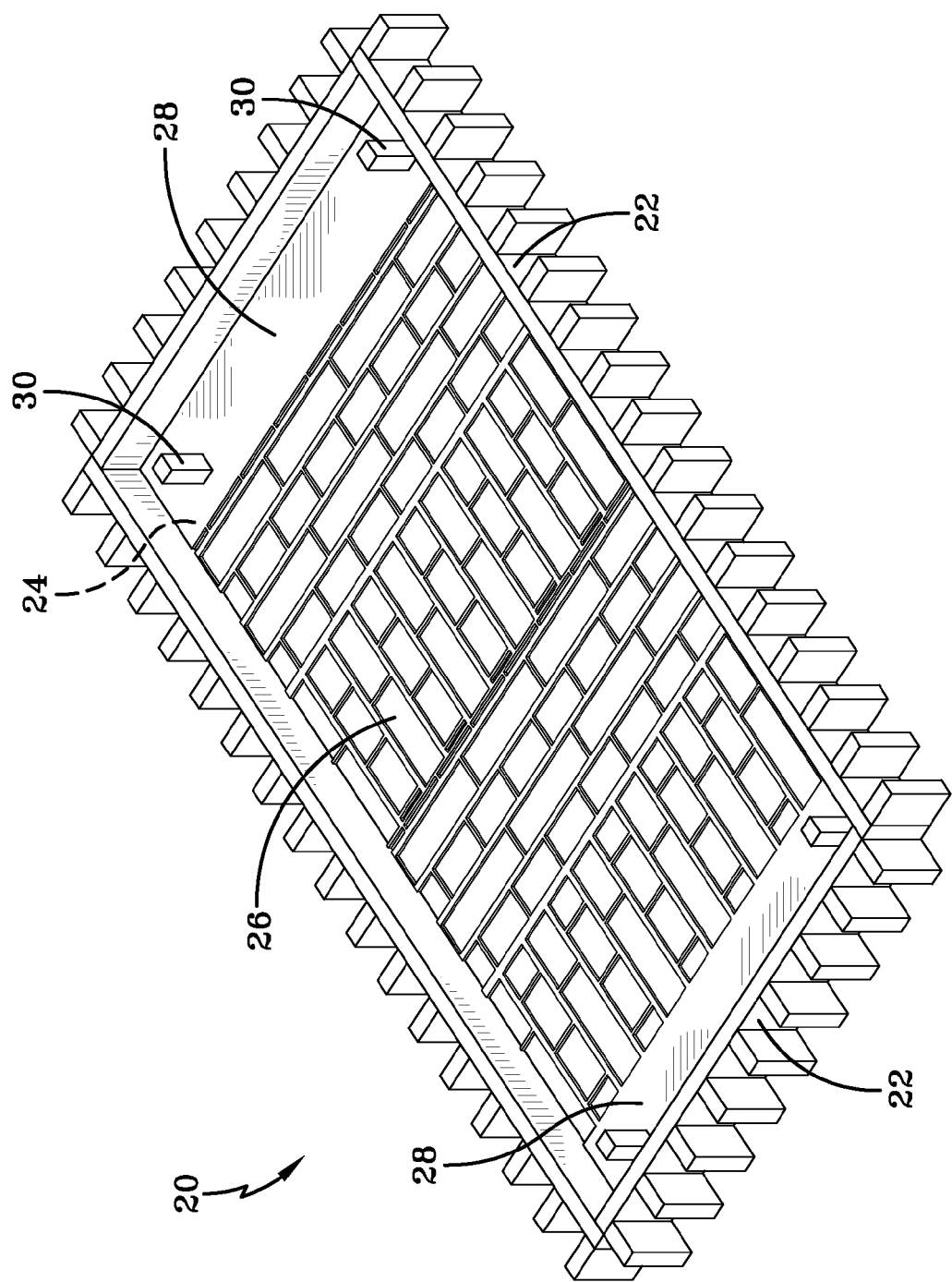
FIG. 2 is a perspective view of an exemplary embodiment of a form used to create a pre-fabricated module of the present invention.

Referring to the drawings, FIG. 1 shows a perspective view of a one exemplary pre-fabricated pavement module 2 of the present invention. The pre-fabricated pavement module 2 (hereinafter "pre-fabricated module" or "module") may be constructed by pouring a pavement material, such as concrete or other similarly used material, into a form 20 (as shown, for example, in FIG. 2). The side walls 22 of the form 20 may be wood, metal, or any other suitable material. The side walls 22 may be designed to form a channel 120 along edges 6 and 8 of the pre-fabricated module 2. The lower portion 24 of the form 20 may comprise a profile mold 26. The profile mold 26 may impart a testing profile onto the driving surface 4 (shown in FIG. 1) of the pre-fabricated module 2. To impart different testing profiles into the driving surface 4, a profile mold(s) 26 may be placed in the lower portion 24 of the form 20. In some embodiments, the profile mold 26 is integral to the form 20. In other embodiments, the profile mold 26 may be a removable insert that is placed in the lower portion 24 of the form 20. Combinations of different profile molds may also be used to provide a single module with more than one testing profile.

The profile mold 26 may be wood, metal, foam, a rubberized material, or any other suitable material. However, the uses of an initially pliable and/or pourable material may allow for the casting of various existing surfaces (e.g., brick or stone surfaces).

In embodiments where the profile mold is an insert, the profile mold may be removed from a pre-fabricated module after its removal from an associated form. One skilled in the art would realize that there are also other ways to form a driving surface of a pre-fabricated module, and all are contemplated by the present invention. For example, a driving surface of a pre-fabricated module of the present invention may be formed by using stamps (not shown in the Figures) to imprint the driving surface before the module has fully cured. As the general use of stamps to imprint concrete and similar materials is well known, the details thereof need not be described herein.

The apron portions 12 of the pavement module 2, as seen in FIG. 1, may be formed by an apron forming element 28 located in the lower portion 24 of the form 20. The apron forming element 28 may be metal, wood, foam, or other suitable material. In other embodiments, the apron portion 12 may be absent, such that the provided profile may extend over the entire driving surface of the pavement module.

Figure 3:
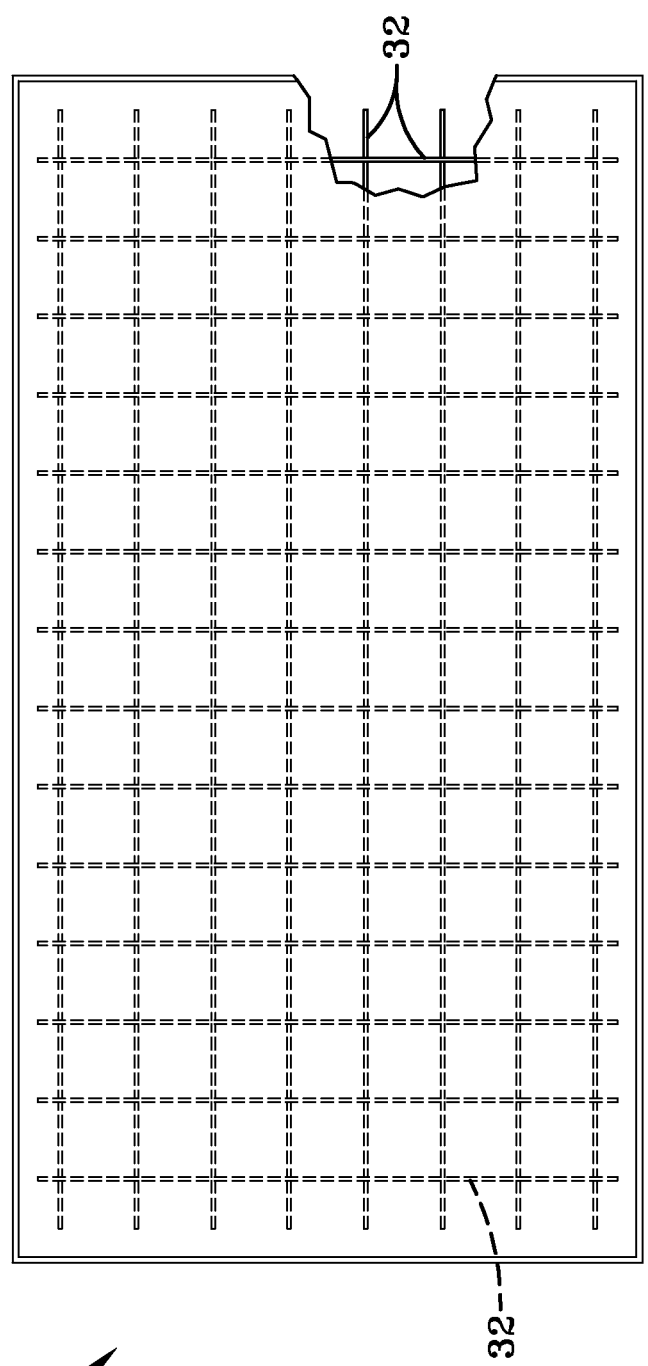
FIG. 3 is a transparent top plan view of an exemplary reinforcement grid that may be placed within a module of the present invention.
Figure 4:
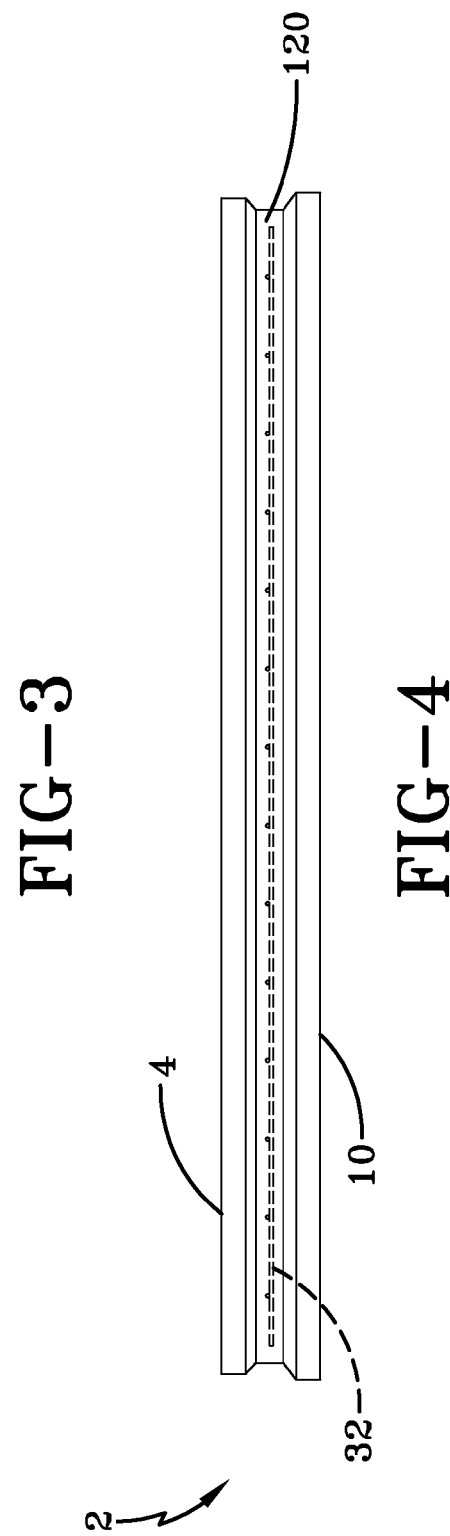
FIG. 4 is a transparent side view of the reinforcement grid of FIG. 3.

To ensure the strength and durability of the pre-fabricated module 2, a reinforcing material 32 such as wires or bars (e.g., rebar) may be placed in the pavement material, as shown in FIGS. 3-4. As shown, the reinforcement material 32 is installed in a grid pattern and is placed mid-depth in the pre-fabricated module 2. Other patterns and installation locations may also be employed. In other embodiments, the pavement material may be reinforced with fibers or other suitable materials.

Referring again to FIG. 1, the pre-fabricated module 2 formed by the fabricating techniques illustrated above will now be described in more detail. As can be seen, the pre-fabricated module 2 may have a rectangular configuration, and may include a driving surface 4 thereon. In other embodiments, the pre-fabricated module 2 may have a curved configuration or virtually any other configuration required to construct a test road of desired design. The driving surface 4 is the upper exposed surface of the pre-fabricated module 2. As explained above, the driving surface 4 may be formed so as to provide a testing profile over which vehicles can be passed. Preferably, but not necessarily, the pre-fabricated module 2 and its associated driving surface 4 are unitarily formed as described above (e.g., by casting or molding).

The module 2 may also include sides 6, ends 8, and a lower surface 10. Both the width W and length L of the module 2 may vary. For example, the width W of the pre-fabricated module 2 may be the same as some predetermined standard road width (e.g., 15 feet), but may be of various other widths as well. Preferably, the length L of a module is sufficient to allow for proper interaction between the given testing profile and a vehicle. However, the length L of the pre-fabricated module 2 may be as long as can be attained by known fabrication techniques, or may be much shorter based on a particular test road to be constructed. The length L and width W dimensions of a module may be different, or may be the same. The height H (i.e., thickness) dimension of the pre-fabricated module 2 can also vary, but should be sufficient to allow the module 2 to withstand the weight of a test vehicle, as well as transportation from the fabrication site to the test road location and subsequent installation. The required height H may also vary based on the use of reinforcement materials. One skilled in the art would realize that the dimensions of the pre-fabricated module 2 may be adjusted to accommodate different vehicles to be tested and to ensure ease of transportation and installation.

As seen in FIG. 1, the module 2 has a driving surface 4. The driving surface 4 may extend the entire length of the module 2, or may occupy only some portion of its length. As shown, the driving surface 4 may occupy less than the entire width of the module 2. Alternatively, the driving surface 4 may occupy the entire width W of the module surface 2. Where the driving surface 4 does not extend the entire width of the module 2, at least one apron portion 12 may occupy the remaining width of the module. The width of the driving surface 4 and the width of the apron portions 12 may be adjusted depending on the type of profile used and vehicle to be tested.

As shown in FIG. 1, the driving surface 4 on a single pre-fabricated module 2 may include multiple independent and identifiable testing profiles. The driving surface 4 shown in FIG. 1 includes alternating "Belgian" brick patterns. The alternating brick profile includes spaced apart "lanes" of a first brick profile 14 and spaced apart "lanes" of a second brick profile 16 that run in parallel along the length L of the module 2. In other embodiments, the first and second brick or other profiles may not run in parallel to one another. The use of different brick or other profiles allows for testing with multiple profiles on a single module 2 by simply altering the position of a passing test vehicle. The alternating first and second brick or other profiles may be of substantially equal width spanning the width of the driving surface 4. In other embodiments, the width of the first and second brick or other profiles may be adjusted independently to conform to specific testing parameters. In still other embodiments, the driving surface 4 may include substantially any number of brick profiles. As multiple modules 2 are linked together to form vehicle test road, the driving surface of the test road may include a variety of testing profiles other than "Belgian" brick. This may be accomplished by employing modules having other driving surface testing profiles, such as, but not limited to cobble stones, full rumble strips, staggered rumble strips, bumps or other raised frame twist imparting elements, and road reflectors.

FIGS. 5-8 illustrate non-limiting examples of other driving surface testing profiles that may be present on a pavement module of the present invention. The examples in FIGS. 5-8 are not intended to limit the number of testing profiles that may be formed on the driving surface of a module of the present invention, as one skilled in the art would understand that a multitude of desired testing profiles may be created on a single module utilizing a forming method similar to that described above.

Figure 5:
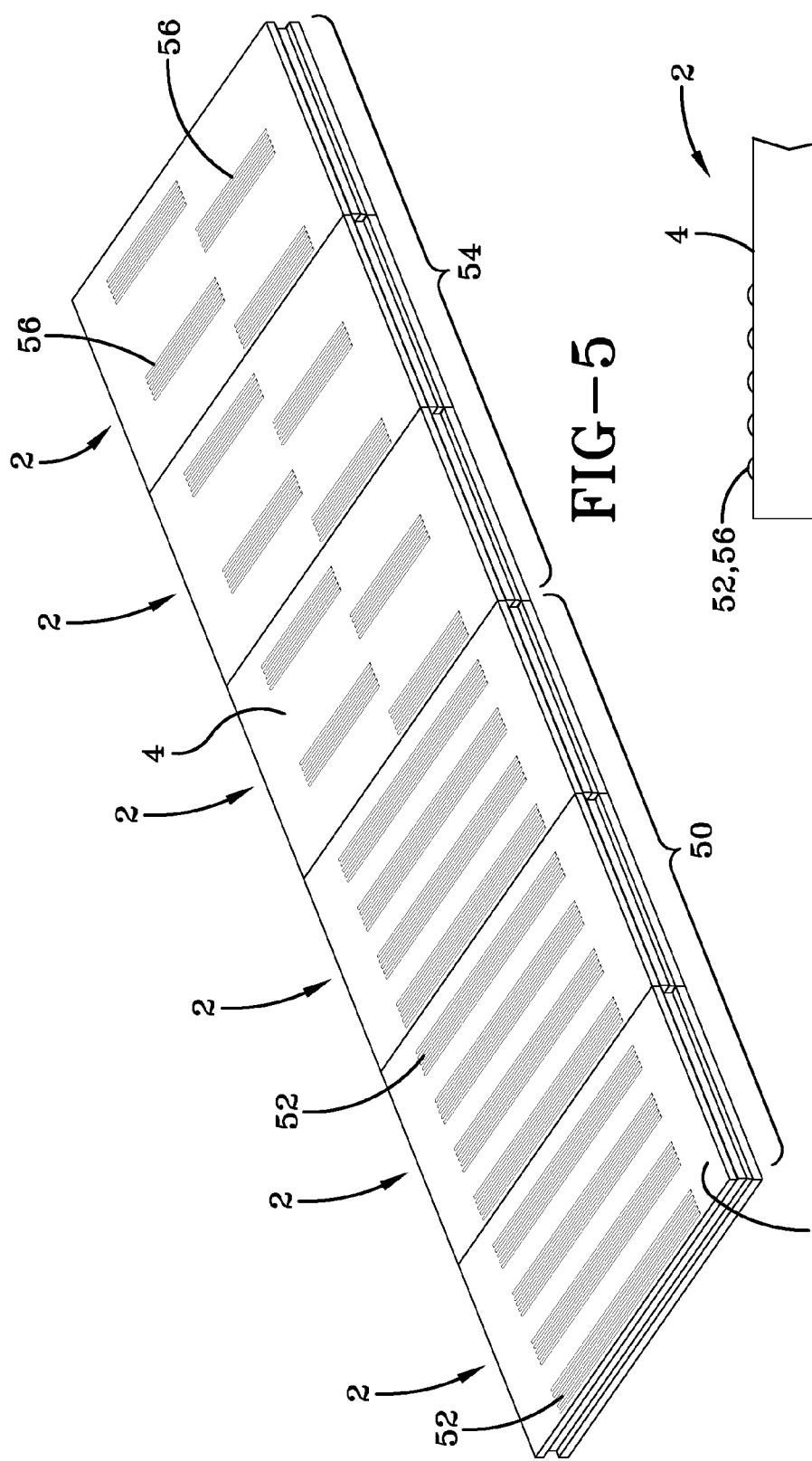
FIG. 5 is a perspective view of an exemplary embodiment of a test road section having multiple pre-fabricated modules.
Figure 6:
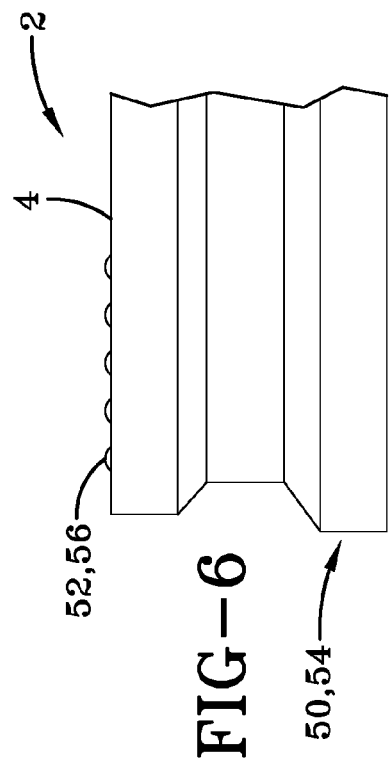
FIG. 6 is an enlarged side view of a rumble strip and staggered rumble strip profile shown to be present on the test road section of FIG. 5.

FIG. 5 is an example of a test road having a driving surface 4 with multiple rumble strip profiles. A first test road section 50 is shown to include several modules 2, each having a full rumble strip profile 52. A second test road section 54 also includes several modules 2, but each module of this test road section includes a staggered rumble strip profile 56. The full rumble strip profile 52 may or may not extend the full width of the driving surface 4, as shown in FIG. 5. As also shown in FIG. 5, the staggered rumble strips 56 may extend some portion less than the entire width of the driving surface 4, such that tires on the driver side and passenger side of a vehicle contact the staggered rumble strips at different times. The rumble strips 52 and 56 may have a partial ovoid shape as can be best observed in FIG. 6, but may also have other shapes as would be understood by those skilled in the art.

Figure 7:
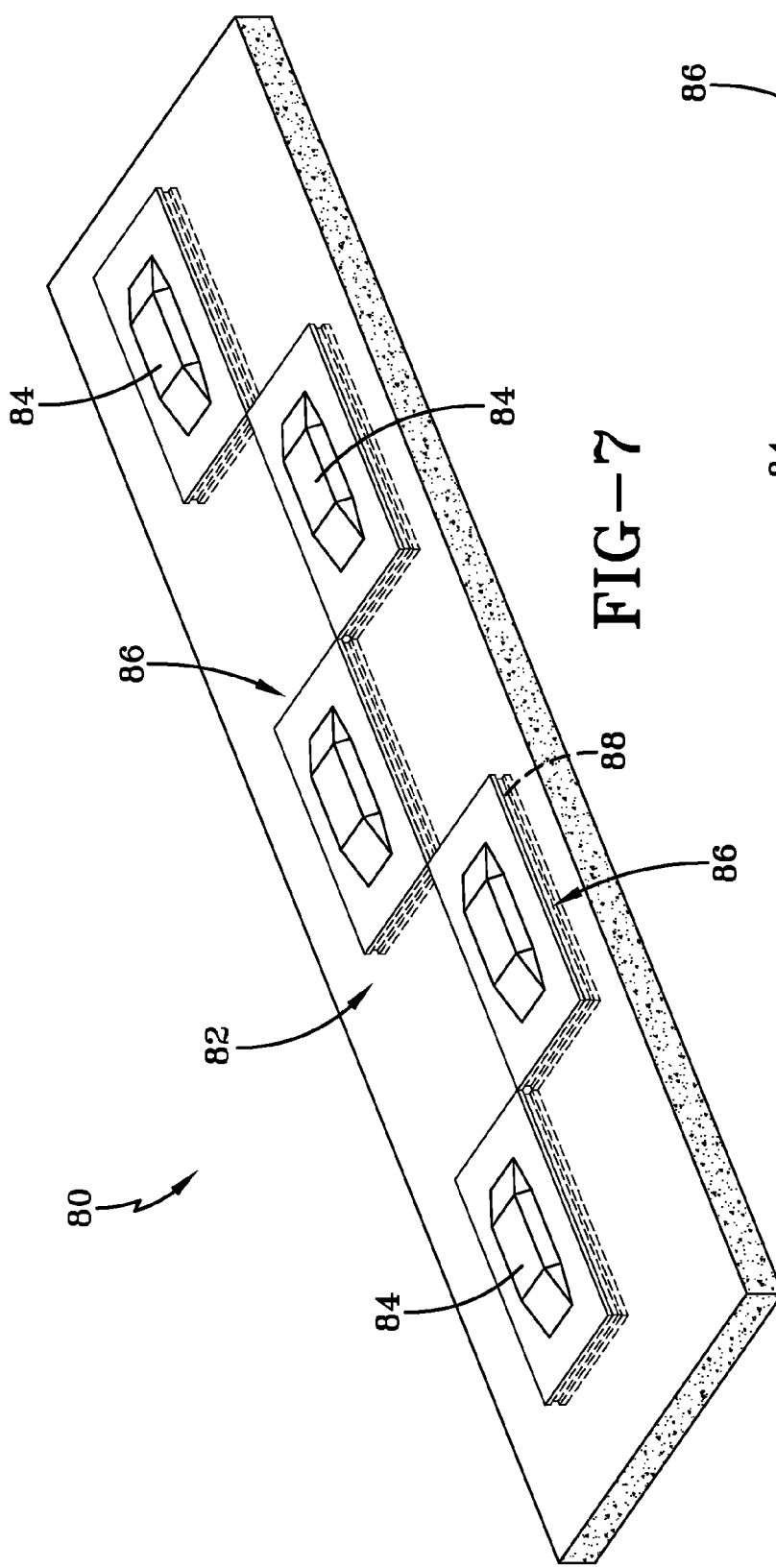
FIG. 7 is a transparent perspective view of an exemplary embodiment of a test road section having multiple pre-fabricated sub-modules embedded therein, wherein the illustrated driving surface is designed to impart body twist to a vehicle during testing.

FIG. 7 is an example of a test road section 80 with a driving surface 4 having a frame twisting profile 82 (i.e., a profile designed to impart a twisting effect to the body of a test vehicle). To achieve the frame twisting profile 82, raised elements 84 are present on the driving surface 4. The raised elements 84 essentially form bumps that may be arranged along the driving surface 4, such that a twisting motion is imparted to a vehicle through only one corner (wheel) of a vehicle at a time. That is, one wheel of the vehicle at a time contacts and passes over a raised element 84. Alternatively, it is also possible to provide a profile that imparts a twisting motion by raising one side (two driver side or two passenger side wheels) of a vehicle at a time (not shown).

The test road section 80 differs somewhat from the previously-described modules of the present invention in that the test road is essentially a poured-in-place road with a number of embedded sub-modules 86. More specifically, each raised element 84 is part of a sub-module 86 that is set in the proper location with respect to the test road section 80 prior to the concrete (or other material) thereof being poured. Each sub-module 86 may be a unitary element of a construction like, or similar to, the module 2 described above. For example, and as can be best observed in FIG. 8, the edges of each sub-module 86 may be constructed with a channel 88 of some shape, such that the sub-modules will be effectively locked into the concrete of the test road 80 after the concrete is poured. The poured concrete of the test road 80 may form the exposed surface surrounding the raised element 84 of a sub-module 86, or the upper sub-module surface 90 surrounding a raised element may be level with the poured concrete of the test road and, thus, exposed.

Figure 8:
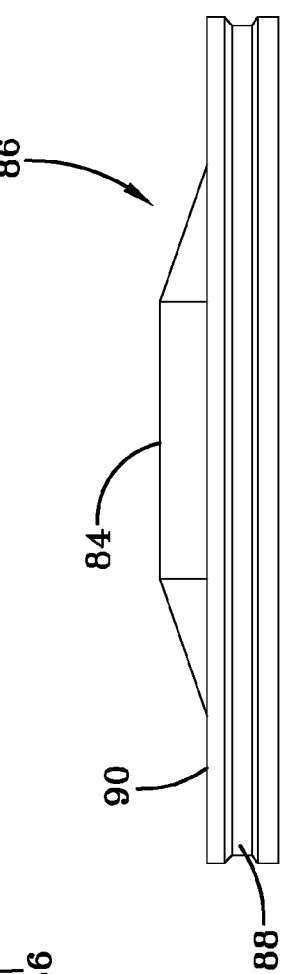
FIG. 8 is a side view of one exemplary testing profile that may be provided by a sub-module of the test road section of FIG. 7.

FIGS. 7-8 also illustrate an exemplary raised element design that may be used to impart a frame twisting motion to a vehicle as described above. As shown, this particular raised element design includes a substantially flat peak surface having a number of inclines leading upward thereto. As such, a vehicle wheel is gradually lifted from and returned to the main driving surface level when traversing such a raised element 84. The size, shape, angle of inclination/declination and other characteristics of such raised elements 84 may vary. The exposed surface of such a raised element 84 may be substantially smooth or may be textured so as to provide differing levels of traction.

A plurality of pre-fabricated modules 2 may be used to form a vehicle test road having a desired driving surface. To create such a test road, the modules 2 are preferably placed on an engineered or otherwise prepared surface (i.e., a road bed) that traces the desired test road path. The engineered surface may be constructed from a compacted material such as gravel or other like material sufficient to provide a durable base for the modules 2. The engineered surface may also have a slope so as to promote drainage.

The modules 2 may be transported to the test road location by truck, rail, etc., and each module may be lowered into place using any number of lifting devices (e.g., forklifts, cranes, gantries, booms, etc.) that can be temporarily associated with or connected to a module as would be understood by those skilled in the art. To this end, a pavement module of the present invention is preferably provided with one or more lifting elements. In certain embodiments, one or more lifting elements 30 (see FIG. 2) may be embedded in or otherwise secured to the apron portion 12 of the module 2. These lifting elements 30 may include, but are not limited to, threaded metal plugs, metal lifting rings or plates, or other similar lifting devices. Such lifting elements could also be embedded in or be secured to two or more sides or ends of a module of the present invention. One skilled in the art would realize that there are a multitude of other ways to facilitate lifting of a module of the present invention, including techniques that do not require any lifting elements to be present on the module.

To construct a test road, modules 2 are set end-to-end in an abutting arrangement. As designated in FIG. 1, the particular modules 2 shown would be set with their ends 8 abutting. The order of the modules will depend on the configuration of the test road and the individual modules that are used in its construction. While it is generally contemplated that the modules 2 will be set end-to-end to form the length of a test road, the creation of a wider test road surface is also possible by setting the modules side-by-side (i.e., with the sides 6 of modules 2 in contact (or close to contact). In any event, the modules 2 are placed on the prepared surface until a test road of desired shape and size is achieved.

In an alternative use of a pavement module(s) of the present invention, one or more modules may be incorporated into an existing test road to impart a particular driving surface testing profile thereto. Using modules of the present invention in this manner is an efficient way to alter an existing test road without necessarily making such alterations permanent. Consequently, the installed module(s) may be subsequently easily interchanged with other modules if they become damaged or if a different driving surface is desired.

Figure 9:
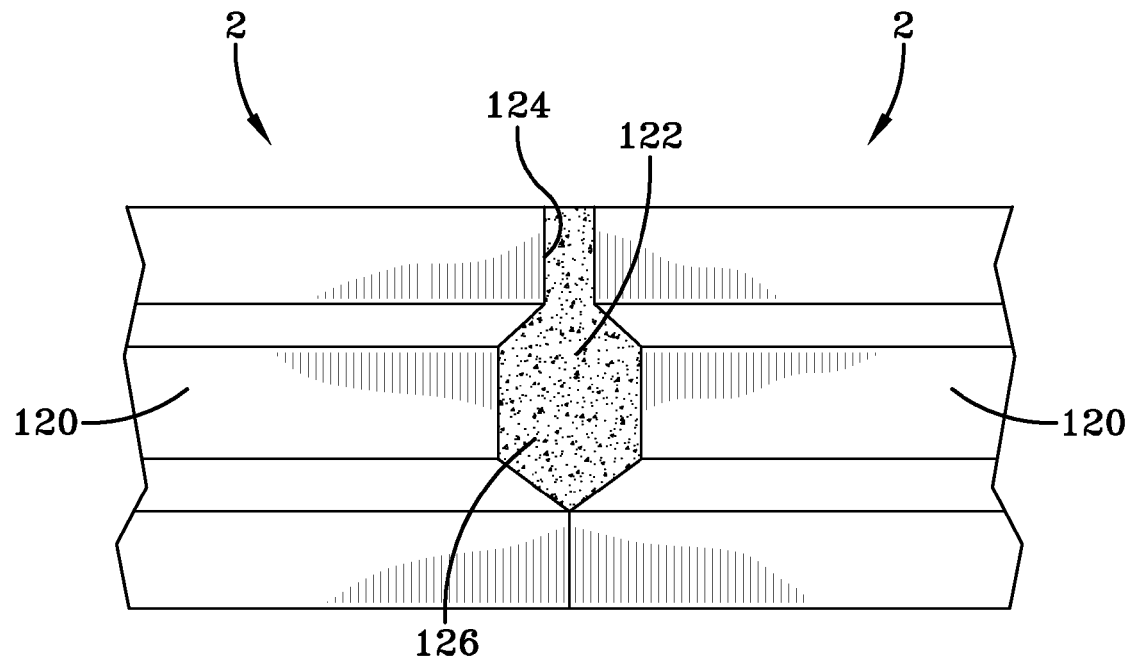
FIG. 9 is a side view illustrating an exemplary embodiment of a grout key that may be used to join certain pre-fabricated modules of the present invention.

To help ensure the stability of a test road constructed of pavement modules of the present invention, adjacent modules 2 may be joined together by various techniques known in the art. One non-limiting technique for joining adjacent modules 2 is illustrated in FIG. 9. According to this technique, each module 2 is provided with a channel 120 at least along its ends 8. In this particular embodiment, a similar channel also runs along the sides 6 of the module 2. In other exemplary embodiments, the side(s) of a module may be devoid of a channel, and/or a channel may be formed on only the end or side of a module that will lie adjacent to another module upon installation. The channel 120 may be formed by the side walls 22 of the form 20 (see FIG. 2) during the molding of the modules 2. Alternatively, the channel 120 may be cut into an already formed module 2.

As shown in FIG. 9, this particular channel 120 has a substantially half-hexagonal geometry. That is, when two modules 2 are arranged end-to-end (or possibly side-to-side), the channels 120 of each module combine to form a substantially hexagonal keyway 122 between the modules. Grout or a similar material may then be introduced into the keyway 122 through the provided keyway opening 124 to form a grout key 126. The grout material introduced into the keyway 122 may be mortar, concrete, or another suitable material, as would be known to one skilled in the art. The grout may be subsequently troweled or otherwise worked to provide a smooth transition between adjacent modules 2. The grout key 126 substantially prevents independent vertical movement of joined modules 2. The use of a grout key 126 also allows for easy replacement of individual modules because, as the grout key eliminates the need for overlapping features, the grout thereof may simply be extracted and an associated module(s) subsequently removed and replaced.

Figure 10:
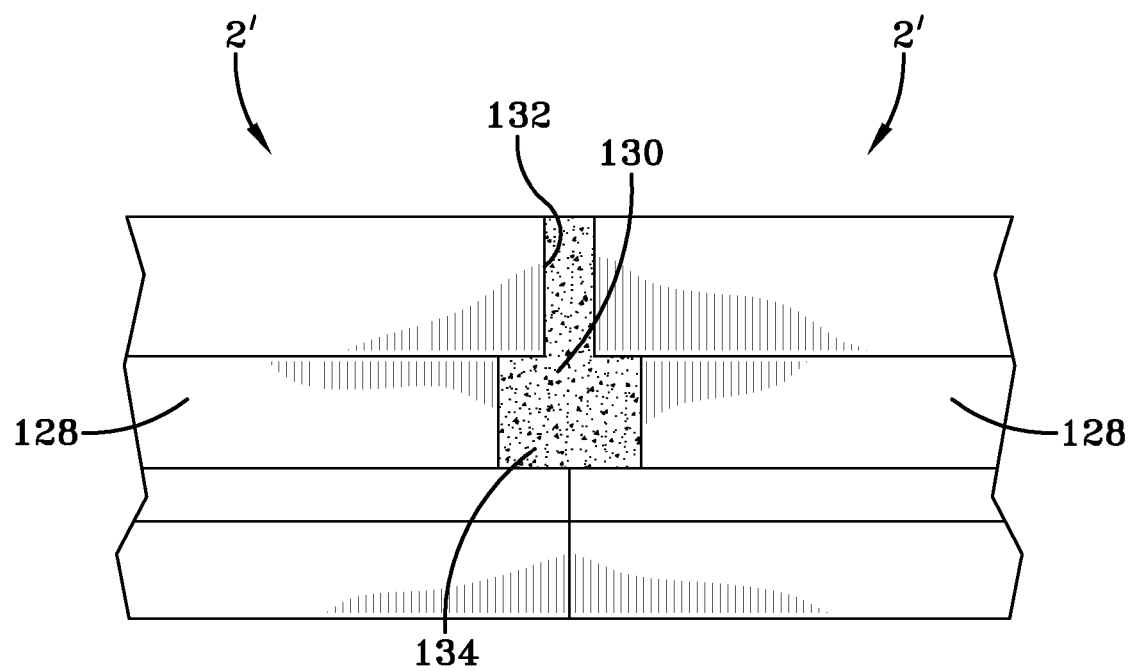
FIG. 10 is a side view of an alternative grout key that may be used to join certain pre-fabricated modules of the present invention.

FIG. 10 depicts an alternative embodiment of a keyway 130 and grout key 134 having a substantially rectangular geometry. In this embodiment, a channel 128 along the ends 8' and/or sides 6' of a module 2' forms half of the illustrated keyway 130. Therefore, in a similar manner to the embodiment shown in FIG. 9, when the ends 8' or sides 6' of modules 2' are placed adjacent to one another, the keyway 130 is formed therebetween. As described above, grout or a similar material may then be introduced into the keyway 130 through the provided keyway opening 132 to form the grout key 134.

Other keyway/grout key geometries are also possible, and nothing herein is to be construed as limiting the present invention to the use of the geometries shown. Furthermore, nothing herein is to be construed as limiting the scope of the present invention to the use of a grout key.

While certain exemplary embodiments of the present invention are described in detail above, the scope of the invention is not to be considered limited by such disclosure, and modifications are possible without departing from the spirit of the invention as evidenced by the following claims:

What is claimed is:

1. A test road constructed from a plurality of pre-fabricated and interchangeable pavement modules, each pavement module comprising:
   a unitary construction having an upper driving surface defined by a vehicle testing profile, a lower surface opposite said upper surface, and opposed sets of side walls and end walls extending upwardly from said lower surface and terminating at said upper surface,
   said modules arranged end-to-end so as to define said test road, adjacent modules secured one to the other by a grout key residing therebetween.

2. The test road of claim 1, further comprising at least one lifting element associated with each module.

3. The test road of claim 1, further comprising a grout key between adjacent modules.

4. The test road of claim 1, wherein said modules reside on a prepared road bed.

5. The test road of claim 1, wherein said modules are comprised of concrete.

6. The test road of claim 1, wherein said vehicle testing profile is selected from the group consisting of: bricks, cobble stones, full rumble strips, staggered rumble strips, raised frame twisting elements, and road reflectors.

7. The test road of claim 1, wherein a module has only one testing profile on its driving surface.

8. The test road of claim 1, wherein a module has more than one testing profile on its driving surface.

9. A method of creating a vehicle test road from pre-fabricated pavement modules, comprising:
   providing a plurality of interchangeable pavement modules, each of said plurality of modules further comprising:
      a unitary construction having a lower surface and an upper driving surface opposite said lower surface,
      at least one vehicle testing profile exposed along said upper driving surface,
      opposed sets of side walls and end walls extending upwardly from said lower surface and terminating at said upper surface, and
      a channel residing in at least each end wall so as to form a grout keyway between adjacent modules when said modules are arranged end-to-end;
   providing a surface adapted to receive said plurality of modules;
   arranging said modules end-to-end so as to define a test road of desired shape and length; and
   introducing a bonding material into said grout keyways between adjacent modules.

10. The method of claim 9, wherein said modules are comprised of cast concrete.

11. The method of claim 9, wherein said test road is provided with a plurality of different vehicle testing profiles.

12. The method of claim 9, further comprising placing channels in at least one of said side walls of a module such that modules can be placed in a side-by-side arrangement to create a test road of greater width, with a grout keyway formed between adjacent modules.

* * * * *